(12) United States Patent
Barros et al.

(10) Patent No.: US 12,174,931 B2
(45) Date of Patent: Dec. 24, 2024

(54) DEVICE ACCESS USING A HEAD-MOUNTED DEVICE

(71) Applicant: GOOGLE LLC, Mountain View, CA (US)

(72) Inventors: Brett Barros, San Mateo, CA (US); Alexander James Faaborg, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 265 days.

(21) Appl. No.: 16/949,032

(22) Filed: Oct. 9, 2020

(65) Prior Publication Data

US 2022/0114248 A1   Apr. 14, 2022

(51) Int. Cl.
  *G06F 21/34* (2013.01)
  *G06F 1/16* (2006.01)
  *G06F 21/32* (2013.01)

(52) U.S. Cl.
  CPC .............. *G06F 21/34* (2013.01); *G06F 1/163* (2013.01); *G06F 21/32* (2013.01)

(58) Field of Classification Search
  CPC .......... H04L 63/0553; H04L 63/0815; H04L 63/0853; H04L 63/107; H04W 12/50; H04W 12/63; H04W 12/30–37; H04W 12/77; G06F 3/011–013; G06F 21/34; G06F 21/445; G06F 21/44; G06F 21/32; G06F 2221/21–2153; G06F 21/35; G06F 2221/41; G06F 21/30–36; G06F 3/012; G06F 3/0346; G06F 2221/2137; G06F 2221/2141; G06F 2221/2149; G06F 2221/2139; G06F 1/32–3298; G02B 27/00–648; G02B 2027/0105–0198; G06V 40/16–197; A61B 5/163; A61B 2017/00216; A16B 5/163; A16B 2017/00216
  See application file for complete search history.

(56) References Cited

U.S. PATENT DOCUMENTS

| | | | |
|---|---|---|---|
| 2008/0216171 A1* | 9/2008 | Sano | H04L 9/32 726/19 |
| 2014/0341441 A1 | 11/2014 | Slaby et al. | |
| 2015/0058942 A1* | 2/2015 | Dermu | H04W 12/35 726/6 |
| 2015/0082406 A1 | 3/2015 | Park et al. | |

(Continued)

OTHER PUBLICATIONS

Chan, Pan, et al., "Glass OTP: Secure and Convenient User Authentication on Google Glass", Conference on Financial Cryptography and Data Security, NYU School of Engineering, New York; International, 2015, 13 pages.

(Continued)

*Primary Examiner* — Amr A Awad
*Assistant Examiner* — Aaron Midkiff
(74) *Attorney, Agent, or Firm* — Brake Hughes Bellermann LLP

(57) ABSTRACT

A head-mounted device (HMD) may be used to determine an access request for accessing a device. An identifier identifying the device may be received at the HMD and from the device. By verifying receipt of the identifier at the HMD, and that access rights associated with the HMD enable granting of the access request, the access request may be granted.

14 Claims, 8 Drawing Sheets

(56) References Cited

U.S. PATENT DOCUMENTS

| | | | | |
|---|---|---|---|---|
| 2015/0365235 A1* | 12/2015 | Hostyn | ................ | H04W 12/04 |
| | | | | 713/184 |
| 2016/0070900 A1* | 3/2016 | Kim | ....................... | G06F 21/34 |
| | | | | 726/3 |
| 2016/0164852 A1* | 6/2016 | McCoy | ................ | H04L 63/061 |
| | | | | 713/168 |
| 2018/0336332 A1* | 11/2018 | Singh | ................. | H04W 12/065 |
| 2019/0268329 A1* | 8/2019 | Toth | .................... | G06F 21/6209 |
| 2020/0064921 A1* | 2/2020 | Kang | .................... | G02B 27/01 |
| 2020/0162459 A1 | 5/2020 | Holle et al. | | |
| 2021/0073362 A1* | 3/2021 | Alameh | ................. | G06F 3/013 |

OTHER PUBLICATIONS

"How to unlock your Mac with your Apple Watch", Apple Support (https://support.apple.com/en-us/HT206995#:~:text=Choose%20Apple%20menu%20%EF%A3%BF%20%3E%20System,Watch%20to%20unlock%20your%20Mac.%E2%80%9D), Oct. 21, 2019, 4 pages.

* cited by examiner

DEVICE ACCESS USING A HEAD-MOUNTED DEVICE

TECHNICAL FIELD

This description relates to device access.

BACKGROUND

Many techniques exist for providing secure and/or personalized access to devices, including, e.g., access to applications running on such devices. For example, such techniques include the use of passwords, one time passwords (OTPs), biometric techniques (e.g., facial, voice, or fingerprint recognition), and others, and combinations thereof. Such techniques may vary widely, e.g., in terms of user convenience, cost to implement, and level of security provided.

SUMMARY

According to one general aspect a computer program product may be tangibly embodied on a non-transitory computer-readable storage medium and may include instructions that, when executed by at least one computing device, are configured to cause the at least one computing device to determine, at a head-mounted device (HMD), an access request for accessing a device, and determine access rights associated with the HMD. The instructions, when executed by the at least one computing device, may be further configured to cause the at least one computing device to receive, at the HMD and from the device, an identifier identifying the device, verify receipt of the identifier at the HMD, verify that the access rights enable granting of the access request, and grant the access request, based on the verified receipt and the verified access rights.

According to another general aspect, a computer-implemented method may include determining, at a head-mounted device (HMD), an access request for accessing a device, determining access rights associated with the HMD, and receiving, at the HMD and from the device, an identifier identifying the device. The method may further include verifying receipt of the identifier at the HMD, verifying that the access rights enable granting of the access request, and granting the access request, based on the verified receipt and the verified access rights.

According to another general aspect, a head-mounted device (HMD) may include at least one memory including instructions, and at least one processor that is operably coupled to the at least one memory and that is arranged and configured to execute the instructions. The instructions, when executed, may cause the at least one processor to determine, at a head-mounted device (HMD), an access request for accessing a device, and determine access rights associated with the HMD. The at least one processor may further be arranged and configured to execute instructions that, when executed, cause the at least one processor to receive, at the HMD and from the device, an identifier identifying the device, verify receipt of the identifier at the HMD, verify that the access rights enable granting of the access request, and grant the access request, based on the verified receipt and the verified access rights.

The details of one or more implementations are set forth in the accompanying drawings and the description below. Other features will be apparent from the description and drawings, and from the claims.

DETAILED DESCRIPTION

Described systems and techniques enable ease of access across a large number and type of devices, with a high level of security if desired, for users wearing a head-mounted device or other wearable device. Since, for example, a head-mounted device may be worn frequently by a user and/or in different contexts, the user may be provided with an ability to access different devices in different ways, with the head-mounted device providing a consistent, convenient user experience. For example, even when different devices use different access techniques, the user may be relieved of a need to remember passwords or other access procedures, while avoiding expensive or time-consuming access procedures, and while still obtaining a high level of security when needed. In some examples, particular aspects of head-mounted devices, such as an ability to determine a viewing angle of a user, may be leveraged to enable or support high levels of security and/or convenience.

Figure 1:
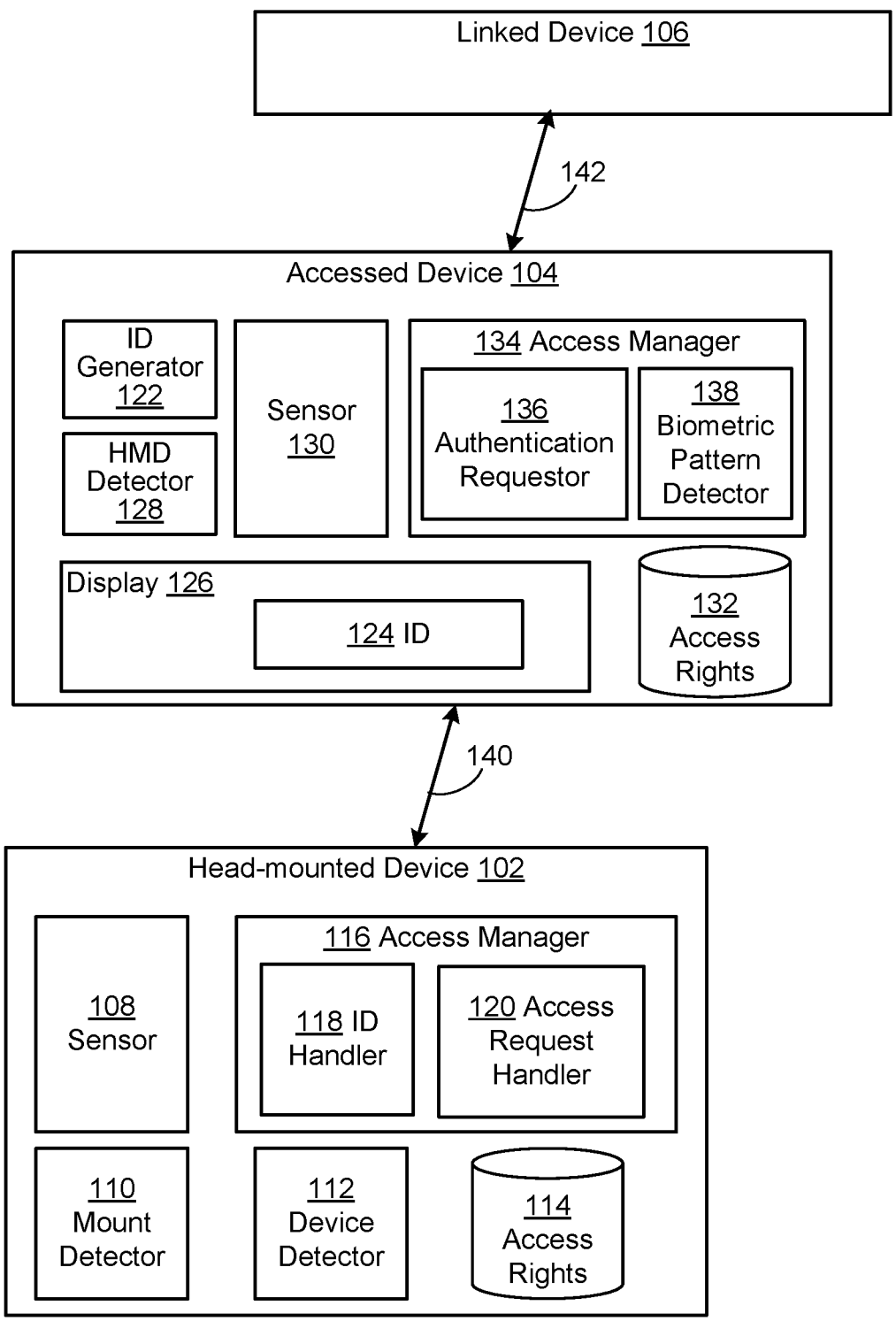
FIG. 1 is a block diagram of a system for providing device access using a head-mounted device.

FIG. 1 is a block diagram of a system for providing device access using a head-mounted device (HMD) 102. In FIG. 1, the HMD 102 is illustrated as establishing access with, or accessing, an accessed device 104, which may itself be connected or otherwise linked to a linked device 106. The HMD 102, as described and illustrated below, may include any hardware (and associated software) that may be worn on a head of a user and that leverages or utilizes its position on the user's head, and/or that relies on or augments user abilities (e.g., sight, hearing, or head position/orientation) to provide functionality to the user. As referenced herein, in some implementations, functionality of the HMD 102 may alternatively or additionally be provided using other, different types of wearable devices, such as watches, rings, or clothing.

For example, the HMD 102 may include or represent glasses, augmented reality glasses, goggles, a hat, helmet, headband, or other headwear. An example embodiment in which the HMD 102 is implemented using glasses is illustrated and described in more detail, below, with respect to FIG. 7.

The accessed device 104 and the linked device 106 may represent any device(s) that may be configured to communicate with the HMD 102, to implement the techniques described herein. By way of non-limiting example, the accessed device 104 may represent a laptop or other personal computer, a terminal, a smartphone, a television, a gaming platform, a game controller, a smart speaker, a smartwatch or other wearable device, and many other types of devices, some examples of which are described in more detail, below.

The HMD 102 may include, or have access to, various types of hardware and software that may be used to implement the techniques described herein. For example, the HMD 102 may include a sensor 108, which may represent one or more types of, e.g., image, audio, or haptic sensor(s), as well as various types of wireless or network connection sensor. The sensor 108 thus includes various types of sensors that may be implemented in different types of devices and associated settings, but that are deployed with, and perhaps optimized for use with, the HMD 102.

A mount detector 110 represents one or more sensors that are specific to detecting aspects of the HMD 102. For example, the mount detector 110 may detect that the HMD 102 is currently being worn by the user. The mount detector 110 may detect or determine a manner in which the HMD is positioned, or a viewing angle of the user with respect to another person or object, e.g., the accessed device 104. The mount detector 110 may interact or interface with the sensor 108.

Thus, it will be appreciated that the sensor 108 and the mount detector 110, and combinations thereof, generally represent any type of hardware sensor, and associated software, that may be utilized to implement the techniques described herein, specific examples of which are provided below. The HMD may include various other types of hardware and software that are not explicitly illustrated or described with respect to FIG. 1, such as different types of hardware/software for input/output (I/O) functionalities. For example, the HMD 102 may include one or more buttons, ports, lenses, screens, or displays, some examples of which are provided below with respect to FIG. 7, or which would be apparent.

A device detector 112 may be configured to utilize one or more of the sensor 108 and the mount detector 110 to detect a presence or availability of the accessed device 104, e.g., in order to initiate access thereto. For example, the device detector 112 may constantly or intermittently scan for a presence of an accessible device. In other examples, the device detector 112 may be configured to receive a wake signal emitted or provided from potentially accessible devices.

For example, the device detector 112 may be configured to receive image data, audio data, infrared (IR) data, or wireless (e.g., Wifi, or Bluetooth) data from the accessed device 104. When such data has directionality, such as image or IR, the mount detector 110 may be used to ensure that a direction of the HMD matches the direction required for detection (e.g., when the HMD 102 includes wearable glasses, and the mount detector 110 ensures that the user is facing displayed image data from the accessed device 104).

Access rights 114 represent any access rights that may be associated with the HMD 102, and/or with the user of the HMD 102. Although the access rights 114 are illustrated at the HMD 102, it will be appreciated that the access rights 114 may be partially or completely stored at, or accessed from, a remote server or other computer with which the HMD 102 may communicate. For example, the HMD 102 may register with a remote server.

The access rights 114 may represent or include any data used to validate, authenticate, or store a preference of, a user of the HMD 102, where such data may thus be used to govern or control access to the accessed device 104, and/or the linked device 106. The access rights 114 may indicate a quantity (extent, level), quality (type, category), or context (situation, condition) of access, as well as specifying access requirements needed to grant corresponding access. More specific and detailed examples are provided below, but in general, the access rights 114 may indicate that previously-authorized access of the user with respect to the HMD 102 may be extended to the accessed device 104, and/or the linked device 106, based on interactions between an access manager 116 of the HMD 102 and the accessed device 104.

The access rights 114 may be established with respect to the HMD 102 using one or more of a plurality of known or future techniques. For example, a user may be required to log into the HMD 102, using the sensor 108, the mount detector 110, and/or one or more types of I/O functionality, as referenced herein. For example, the user may be required to submit a password or code to the HMD, or various types of biometric techniques may be used (e.g., fingerprint or retinal recognition). As referenced above, the HMD 102 may also be registered with, e.g., authenticated against, a remote server or system, for which a separate password or other authentication may be required.

The access rights 114 may specify an access time window, during which it is possible to conditionally share or extend aspects of the access rights 114 to other devices, such as the accessed device 104. The access time window may be defined with respect to start and end times, such as when the user logs in to, and logs out of, the HMD 102, and/or when the user puts on, and takes off, the HMD 102 (as detected by the mount detector 110).

In specific examples, the HMD 102 may initially acquire authentication credentials locally, and then reapply the authentication credentials with respect to gaining or maintaining access (e.g., authentication) at the accessed device 104. For example, authentication at the HMD 102 may occur by typing in a password. Authentication at the HMD 102 may occur by a unique biometric signature, such as a fingerprint, a retina scan, or by a user using facial recognition to perform self-recognition by looking at a mirror or reflective surface while wearing the HMD 102. Authentication by proxy may be performed when the HMD 102 uses the sensor 108 to detect user authentication using a separate device (e.g., a smartphone of the user). Persistence of the authentication through the access time window may occur through determining correlations with physical behaviors of the user. For example, authentication persistence may continue as long as the user continues to wear the HMD 102 continually (or only removes the HMD 102 for a defined quantity of time or less). In other examples, when the user is wearing some other wearable device (e.g., a watch, or ring), the authentication persistence may continue as long as inertial measurement unit (IMU) data from the HMD 102 corresponds to IMU data from the wearable device.

As described below, the access manager 116 may leverage the access time window, and the physical presence or proximity of the HMD 102 relative to the accessed device 104, to facilitate extension or authorization of the access rights 114 to the accessed device 104, and the linked device 106. More specifically, the access manager 116 may include one or both of an identifier (ID) handler 118 and an access request handler 120. For example, an ID generator 122 at the accessed device 104 may generate an ID 124, which may be received by the ID handler 118. In the example of FIG. 1, the ID 124 is shown as being displayed using a display 126 of the accessed device 104, which may occur, for example, when the ID 124 includes a quick response (QR) code or other visual symbol. However, many different types of ID 124 may be used, including but not limited to, an audio ID, a wireless signal ID, or an IR ID. Additional examples of ID implementations are provided below, or would be apparent.

The access request handler 120 may receive an access request, e.g., from a user of the HMD 102, or from the accessed device 104. For example, as referenced above, the device detector 112 may detect a presence and availability of the accessed device 104. In other examples, a user of the HMD 102 may simply observe a presence and availability of the accessed device 104. The user of the HMD 102 may utilize appropriate I/O functionality of the HMD 102 to initiate an access request with respect to the accessed device 104 (e.g., pressing a button, or speaking a command).

In other examples, the accessed device 104 may transmit or provide an access request. For example, similar to the device detector 112, the accessed device 104 may include a HMD detector 128. The HMD detector 128 may be configured to detect a presence or proximity of the HMD 102, using techniques described with respect to the device detector 112, or other techniques. In particular, when the accessed device 104 is plugged in or otherwise has a superior power source than the HMD 102 (e.g., larger battery), then the HMD detector 128 may be better-suited to perform frequent or consistent detection than the device detector 112, which may be constrained by a relatively smaller power supply at the HMD 102.

The HMD detector 128 may be configured to initiate an access request, based at least on its detection of the HMD 102. For example, in response to such detection, the HMD detector 128 may provide an access request to the access request handler 120, and an ID generation request to the ID generator 122. Accordingly, the ID handler 118 may proceed to detect the ID 124, and thereby enable the access manager 116 to extend the access rights 114 to the accessed device 104.

In some implementations, functionalities of the ID handler 118 and the access request handler 120 may overlap. For example, the ID 124 may be constantly or consistently provided by the accessed device 104. In these and similar cases, the ID 124 may serve as both an identification of the accessed device 104, and a de facto or automatic access request.

The accessed device 104 may include at least one sensor 130 that may be configured to facilitate the above-described functions of, and interactions between, the accessed device and the HMD 102. For example, the sensor 130 may provide sensing functions used by the HMD detector 128, such as image sensing, or audio sensing. The sensor 130 may also be used to detect a response from the access manager 116 in confirming and validating a receipt of the ID 124, or otherwise confirming approval of an access request. Other example instances and uses of the sensor 130 are provided below, or would be apparent.

As referenced above, the access manager 116 of the HMD 102 generally grants or extends the access rights 114 to the accessed device 104, to thereby provide the user of the HMD 102 with access to functionalities of the accessed device 104, including necessary connections and communications between the HMD 102 and the accessed device 104. Such functionalities of the accessed device 104 will depend on a nature and type of the accessed device 104, and of the linked device 106.

In addition, the accessed device 104 may provide access rights 132 to the user of the HMD 102, which may be governed by a local access manager 134. The access rights 132 may govern a manner and extent to which functionalities of the accessed device 104 are provided to the particular user of the HMD 102, or to HMD users in general.

For example, the access manager 134 may require authentication of the user of the HMD 102, prior to granting access to functionalities of the accessed device 104. In such cases, authentication data for the user may be stored using the access rights 132, which, similar to the access rights 114, may be stored partially or completely at a remote server or system.

The authentication requestor 136, for example, may utilize a biometric pattern detector 138, such as a facial recognition detector. In such cases, in conjunction with an access request, which may include an authentication request, a suitable facial recognition algorithm may be used to validate the user of the HMD 102 against the access rights 132 (e.g., authentication data).

Such authentication may be performed prior to or following an access request, and may be in conjunction with, or separate from (e.g., in addition to), the access request. For example, in this way, a two-factor authentication process may be performed, as described below with respect to FIGS. 3 and 4.

Finally in FIG. 1, the HMD 102 is illustrated as being connected to, or interacting with, the accessed device 104, via link or channel 140. As referenced herein, the channel 140 may represent one or more of many possible types of channels, and combinations thereof, that may be used to enable communications between the HMD 102 and the accessed device 104 using available I/O functionalities of each of the HMD 102 and the accessed device 104. For example, the channel 140 may include Bluetooth, Wifi, visual (e.g., light-based) communications, audio, or IR communications.

The channel 140 may leverage a physical presence of the user of the HMD 102, in proximity to the accessed device 104, and as verified by interactions that occur between the HMD 102 and the accessed device 104. In this way, assurance may be provided by the techniques described herein that the accessed device 104 will be prevented from being remotely hacked or otherwise accessed inappropriately. Nonetheless, in some implementations, the accessed device 104 may communicate with the linked device 106 via a channel 142, which may include a remote channel. The channel 142 may also include or represent the types of channels referenced above with respect to the channel 140.

Figure 2:
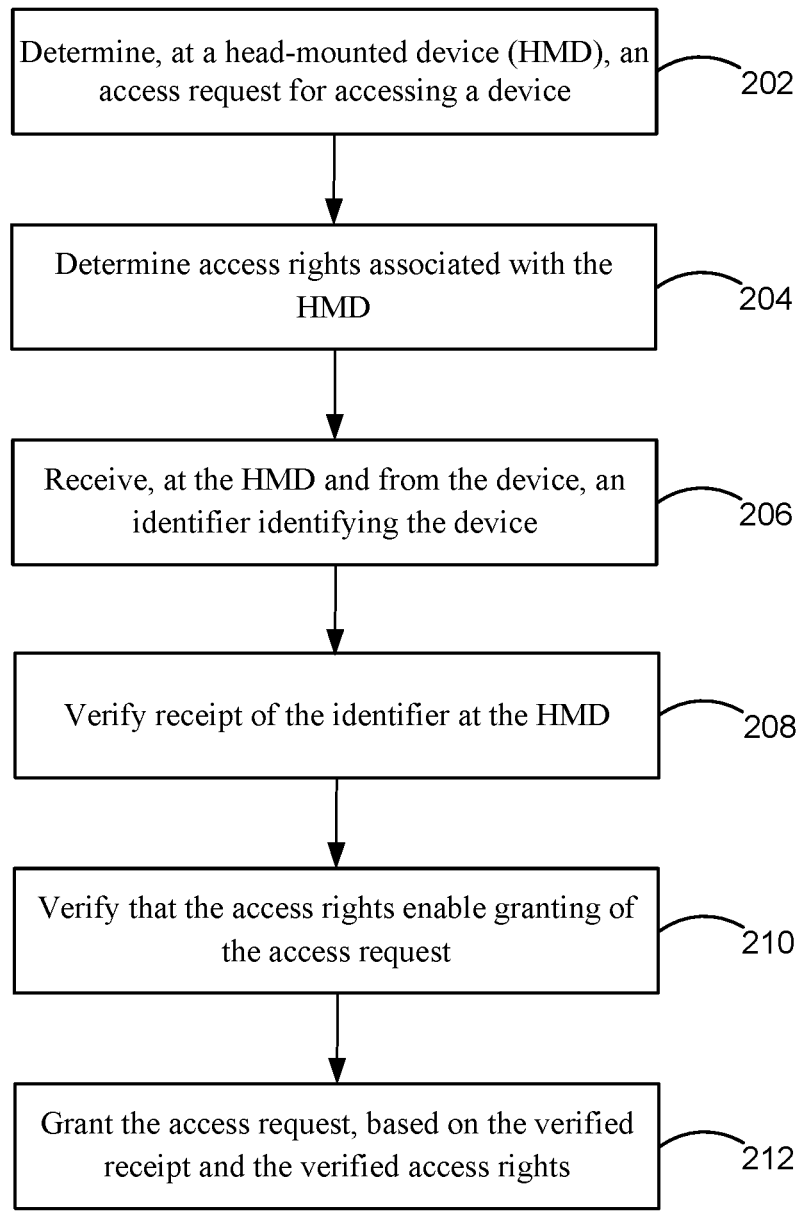
FIG. 2 is a flowchart illustrating example operations of the system of FIG. 1.

FIG. 2 is a flowchart illustrating example operations of the system of FIG. 1. In the example of FIG. 2, operations 202-212 are illustrated as separate, sequential operations. However, in various example implementations, the operations 202-212 may be implemented in an overlapping or parallel manner, and/or in a nested, iterative, looped, or branched fashion. Further, various operations or sub-operations may be included, omitted, or substituted.

In FIG. 2, at a HMD, an access request for accessing a device may be determined (202). For example, the HMD 102 (e.g., the access request handler 120) may receive an access request from either or both of the user of the HMD 102, or from the accessed device 104. For example, as referenced herein, a user may utilize I/O functionality of the HMD 102 to initiate an access request, such as pressing a button on the HMD 102, or speaking a command detected by audio sensors of the HMD 102, or by directing/aiming a screen of the HMD 102 (e.g., looking) at the accessed device 104. Thus, the access request may be determined as originating at the HMD 102 and identifying the accessed device 104, including, e.g., detecting the directing of a field of view of the HMD 102 (e.g., a field of view of a camera of the HMD 102) towards the accessed device 104. The access request may be initiated (automatically or manually) in response to a detection of the accessed device 104 by the device detector 112.

Similarly, the accessed device 104 may initiate the access request. For example, the accessed device 104 may continuously or constantly emit the ID 124 as an access request. The access request may be initiated (automatically or manually) in response to a detection of the HMD 102 by the HMD detector 128. The access request may be initiated in response to an action taken by the user of the HMD with respect to the accessed device 104, such as activating the display 126.

Thus, the requested access may include access of the HMD 102 to the accessed device 104 and/or the linked device 106, as well as access of the accessed device 104 and/or the linked device 106 to the HMD 102. In some cases, the access request may be entirely passive, without requiring action on a part of the user of the HMD 102, or only requiring the user of the HMD 102 to look at the accessed device 104 to initiate access.

As described herein, requested access to the accessed device 104 may include varying levels and types of access. For example, requested access may include access to a specific application or process executing on the accessed device 104, or on the linked device 106. In other implementations, access may include access to an entirety of available functionality of the accessed device 104, or of the linked device 106.

Further in FIG. 2, access rights associated with the HMD may be determined (204). For example, the access request handler 120 may determine access rights. Access rights may represent or include either or both of the access rights 114 of the HMD 102, or the access rights 132 of the accessed device 104. Access rights may include any of a range of potential types of access, including preference data, validation data, and authentication data. Corresponding authentication levels may include establishment of highly-secured channels, suitable for conducting financial transactions and other secure data exchanges. The access rights 114 may include establishment of an access time window, during which some access requirements may be loosened or eliminated, as long as conditions of the access time window are maintained (e.g., as long as the HMD 102 is worn by the user, or until the access time window terminates).

An identifier may be received at the HMD and from the device, identifying the device (206). For example, the ID 124 may be received by the ID handler 118. The ID 124 may include any verifiable (e.g., unique) signal transmitted by the accessed device 104 to the HMD 102, including visual, audio, network, or IR signals.

In some implementations, the identifier may be received passively by the HMD 102, without requiring further action on the part of the user of the HMD 102. For example, the identifier may be transmitted audibly, or transmitted by the channel 140, such as an established Bluetooth connection. In other implementations, the user of the HMD 102 may be required to take at least some action to receive the ID 124 as displayed using the display 126, e.g., by directing sensors (e.g., image sensors) at the display 126. Other examples for transmitting the ID 124 are provided herein, or would be apparent.

Receipt of the identification signal at the HMD may be verified (208). For example, the HMD 102 (e.g., the access manager 116, including the ID handler 118 or the access request handler 120) may communicate received, unique information contained in the ID 124 back to the accessed device 104. In this way, the accessed device 104 may match or otherwise correspond the received, verified identifier with the originally-transmitted identifier, and thereby establish a physical presence of the HMD at the accessed device.

The access rights may be verified as enabling granting of the access request (210). For example, the access request handler 120 may determine from the access rights 114 that the user of the HMD 102 has access rights to access the accessed device 104 in the manner requested. When the requested access is based at least in part on the access rights 132, the access manager 134 of the accessed device 104 may be utilized to assist in verifying that the access rights 132 enable granting of requested access to the accessed device 104.

The access request may thus be granted, based on the verified receipt and the verified access rights (212). For example, the access manager 116 may grant the access request, either directly or based on a response of the access manager 134 of the accessed device 104.

Figure 3:
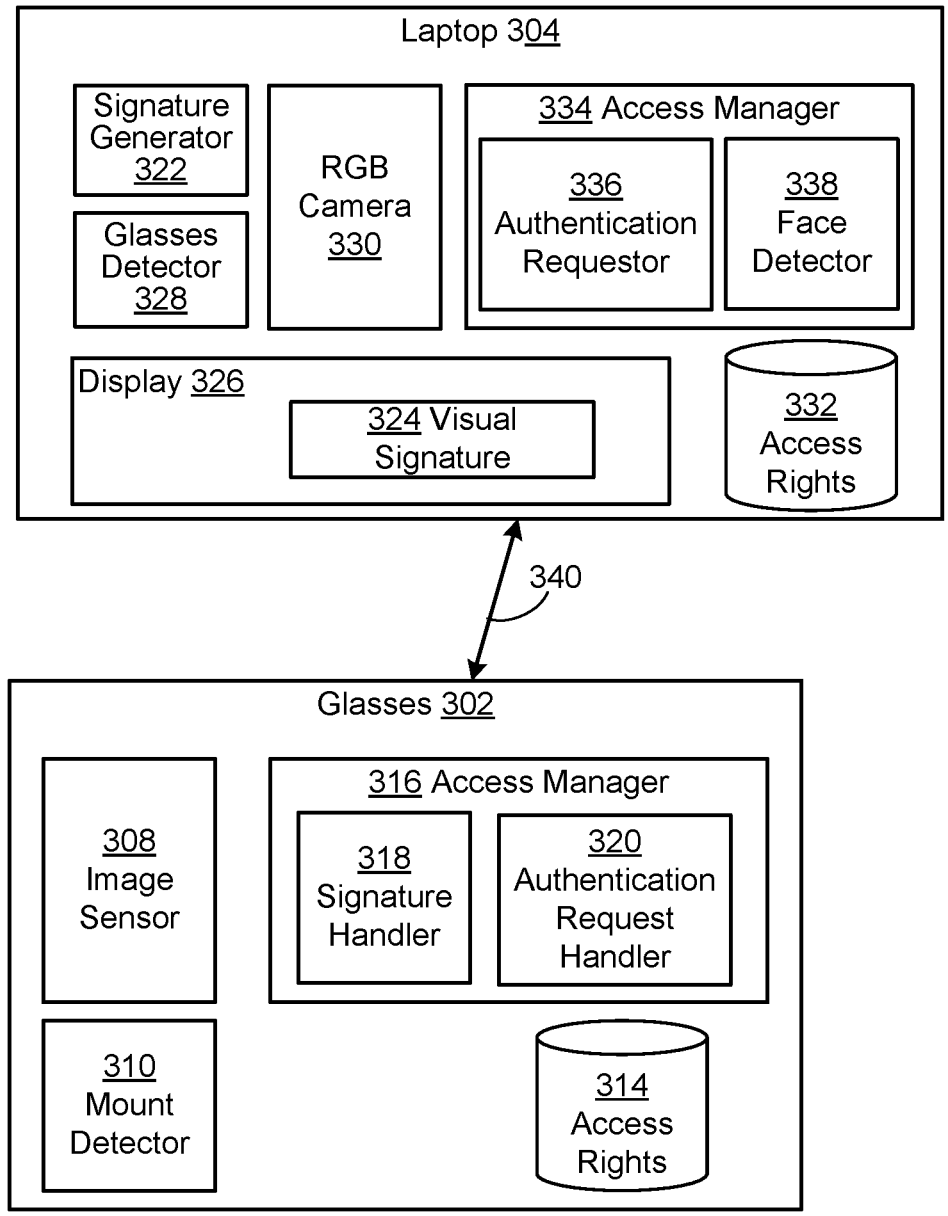
FIG. 3 is a block diagram of an example system for providing visual two-factor authentication using the system of FIG. 1.
Figure 4:
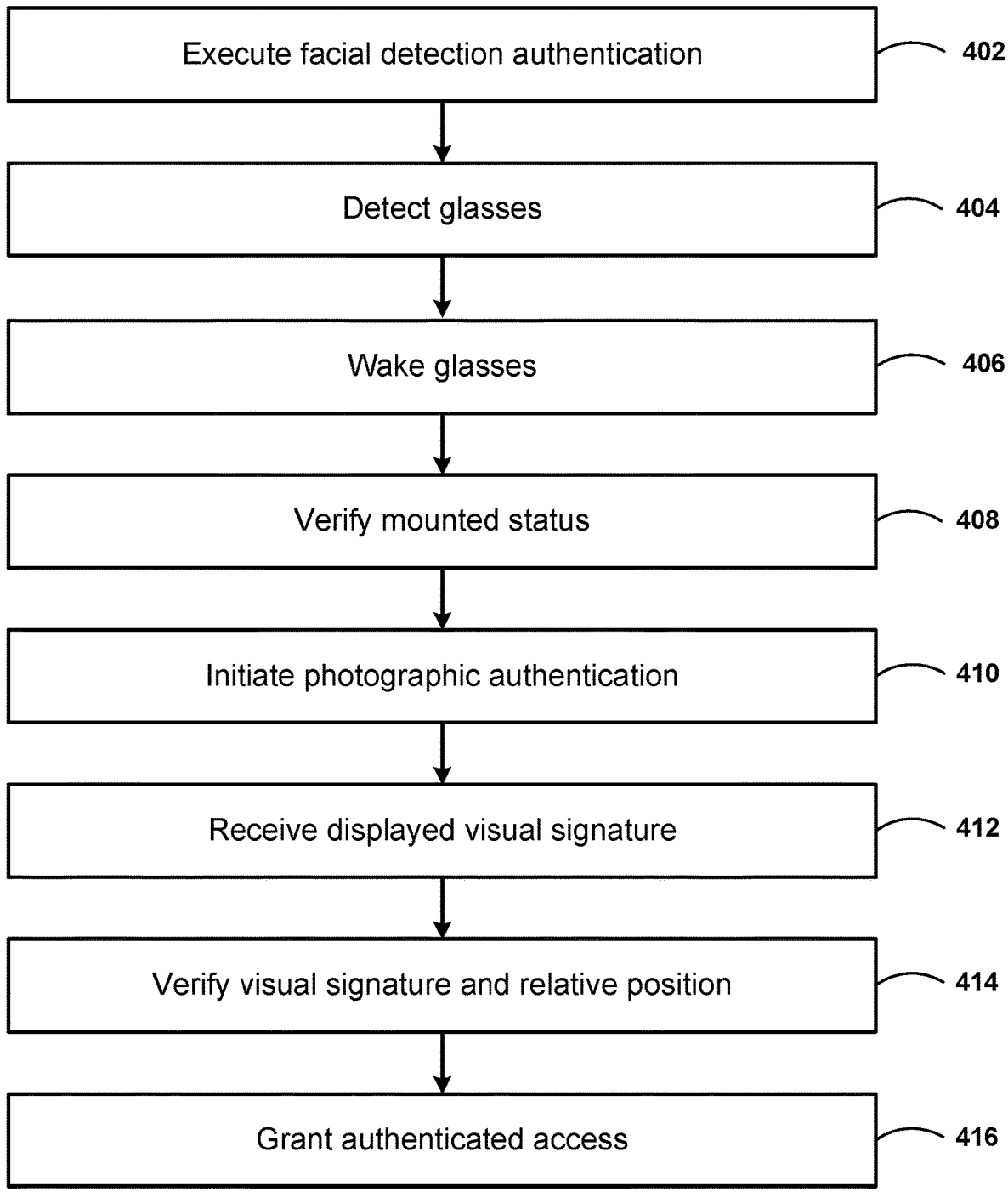
FIG. 4 is a flowchart illustrating example operations of the system of FIG. 3.

FIG. 3 is a block diagram of an example system for providing visual two-factor authentication using the system of FIG. 1. FIG. 4 is a flowchart illustrating example operations of the system of FIG. 3.

Figure 7:
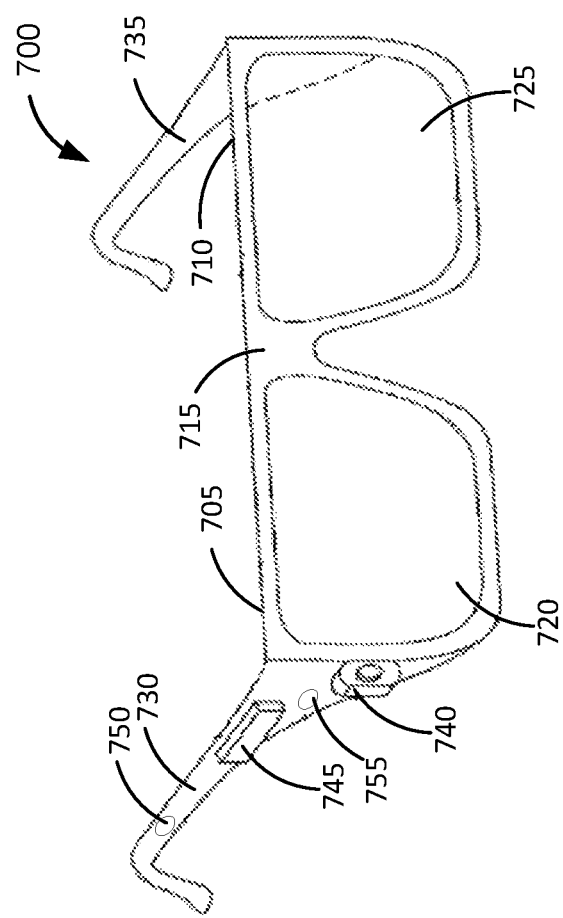
FIG. 7 illustrates an example pair of wearable glasses that may be used with the system of FIG. 1.

In the example of FIG. 3, a HMD may be represented by glasses 302, such as those illustrated in FIG. 7. An accessed device may be represented by a laptop 304. Other types of HMDs and accessed devices may be used to implement the visual two-factor authentication of FIGS. 3 and 4, and variations thereof.

In FIG. 3, it may occur that a user wearing the glasses 302 wishes to authenticate against, and gain access to, the laptop 304. Many techniques exist for authenticating a user for access to a laptop, but which suffer from various shortcomings. For example, a conventional username/password combination may be difficult or inconvenient for a user to remember and use, while being susceptible to being stolen. Facial recognition is convenient, but is susceptible to failure (such as being fooled by a photograph of the user), particularly when performed by a standard Red-Green-Blue (RGB) camera found on most laptops. More expensive hardware can be used for authentication, including use of an IR camera and associated hardware to perform more secure facial recognition, but the increased expense is undesirable.

In the example of FIG. 3, standard, convenient facial recognition may be performed as a first authentication factor, and authentication techniques of FIGS. 1-2, leveraging the physical presence and other properties of the glasses 302, may be implemented as a second authentication factor. The resulting two-factor authentication provides a high level of security, in a convenient, inexpensive manner.

The glasses 302 include various elements illustrating examples of corresponding elements in the HMD 102 of FIG. 1. For example, an image sensor 308, a mount detector 310, and access rights 314 are illustrated, along with an access manager 316 that includes a signature handler 318 and an authentication request handler 320, all of which are specifically configured to execute the techniques of FIG. 1 as an individual authentication factor in the visual two-factor authentication techniques of FIG. 3, as described below.

For example, the laptop 304 may include a signature generator 322, as an example instance of the ID generator 122 of FIG. 1. The signature generator 322 may generate a visual signature 324 on a display 326 of the laptop 304, corresponding to an example of the ID 124 on the display 126 of FIG. 1. The signature generator 322 may execute in response to detection of, and communication with, the glasses 302, by a glasses detector 328, which itself may utilize a standard RGB camera 330 of the laptop 304 to perform detection of the glasses 302.

In this way, access rights 332 of the laptop 304, and/or the access rights 314 of the glasses 302, may be granted to the user of the glasses 302. Specifically, an access manager 334 may implement an authentication requestor 336 and a face detector 338 to perform facial-recognition authentication as an individual authentication factor of a visual two-factor authentication process.

FIG. 4 illustrates an example process for utilizing the system of FIG. 3, or a similar system, to provide visual two-factor authentication. As shown in FIG. 4, facial detection authentication may be executed initially (402). For example, the access manager 334 of the laptop 304 may execute a standard facial recognition process, using the face detector 338.

For example, a user of the glasses 302 and the laptop 304 may wake the laptop 304 using standard techniques, such as raising a screen of the laptop 304, or striking a key of a keyboard of the laptop 304. The laptop 304 may be locked for access, but may be configured to immediately execute a facial-recognition method, using the face detector 338 and the RGB camera 330. The resulting image of the user's face may be authenticated against authentication data, such as within the access rights 332.

Upon successful completion of the facial-recognition authentication method as the first factor of a visual two-factor authentication method, the access manager 334 may be configured to initiate the second factor thereof. For example, the glasses detector 328 may detect the presence of the glasses 302 (404), perhaps from the images used during the facial-recognition authentication, and the authentication requestor 336 may then send a wake signal to the glasses 302 (406) to initiate the second authentication factor.

The wake signal may be sent by way of a channel 340, or may be executed using any suitable visual or audio signal transmitted by the laptop 304. As referenced herein, the wake signal may precede or include an authentication request from the authentication requestor 336, which may be received by the authentication request handler 320 of the glasses 302.

In conjunction with initiating the second authentication factor, the glasses 302 may determine that the glasses 302 are being worn by the user, e.g., may determine a mounted status using the mount detector 310 (408). Accordingly, the glasses 302 may indicate that the user is entitled to the access rights 314. For example, the mount detection may indicate that the user is logged into the glasses 302 (using a password, fingerprint recognition, or other technique), and/or that the user is within an access time window of having previously logged into the glasses 302.

In FIG. 4, the authentication requestor 336 and/or the access manager 316 may initiate photographic authentication (410) as the second authentication factor, by instructing the signature generator 322 to generate the visual signature 324 for display on the display 326. A corresponding authentication request, if not already included in/with the wake signal to the glasses 302, may be provided in conjunction with initiating the photographic authentication.

The glasses 302 may then receive the displayed visual signature 324 (412), e.g., at the signature handler 318. Accordingly, the visual signature 324 may be verified, including verifying a relative position of the glasses 302 and the laptop 304 (414). For example, the signature handler 318 may transmit the received visual signature 324 to the access manager 334 for matching against the original visual signature 324. The RGB camera 330 may detect a relative position (e.g., viewing angle) of the user and/or the glasses, and the glasses 302 may similarly use the image sensor 308 to detect a relative position with respect to the laptop 304. Accordingly, the access manager 334 may verify the two detected relative positions with respect to one another, as another verification that the user is physical present and entitled to authentication.

Finally, authenticated access may be granted (416). For example, the access manager 334 may grant access to the user of the glasses 302 to any application or functionality of the laptop 304 specified in either or both of the access rights 314, 332. The granted access may be associated with an access time window that is defined with respect to a time during which the user continues to wear the glasses 302, as detected by the mount detector 310, or other preconditions.

Figure 5:
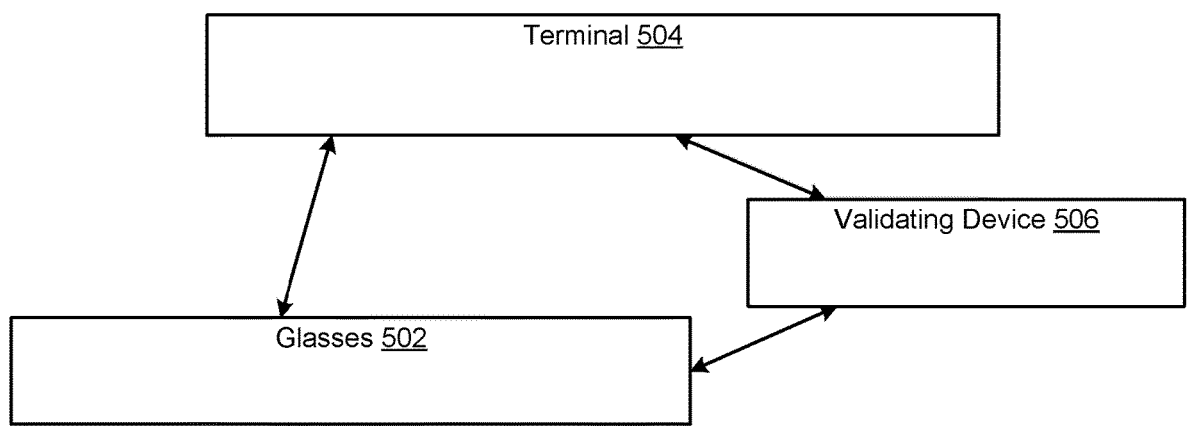
FIG. 5 is a block diagram of an example system for providing terminal access using the system of FIG. 1.

FIG. 5 is a block diagram of an example system for providing terminal access using the system of FIG. 1. In the example of FIG. 5, glasses 502 may be configured to interact with a terminal 504. As described, the glasses 502 may leverage validation techniques available through a separate, validating device 506. In FIG. 5, individual components of the glasses 502, terminal 504, and validating device 506 are not illustrated and described in detail, but would be understood to include suitable variations or instances of corresponding components described with respect to FIGS. 1-4.

In FIG. 5, the terminal 504 represents any device that may have some level of public or multi-user access. For example, public terminals may be found in public areas, such as airports or hotels. Other multi-user terminals may be found, for example, in school or work environments, in which multiple students or employees share a pool of computing resources (e.g., a computer lab, or shared workspace). Within more private spaces, such as within home environments, multiple users may share access to a single device or network of devices, such as when family members, roommates, or visitors wish to share access to a television, speaker, or network.

For purposes of the examples described below with respect to FIG. 5, the terminal 504 represents a computing device having relatively fewer resources available, or allocated, for user personalization, validation, authentication, or other types of access, as compares to personal or dedicated devices. The terminal 504 may also provide reduced levels of physical and device security, as compared to personal or dedicated devices.

Nonetheless, using the techniques described herein, the glasses 502 may be configured to provide convenient access to the terminal 504, with varying types and extents of access, and without requiring additional resources at the terminal 504. For example, the terminal 504 may constantly display or provide an identifier, as described above, for example, with respect to the ID 124 of FIG. 1. The glasses 502 may recognize the identifier and provide the user of the glasses with authorized access to the terminal 504. For example, in a public setting, the user may be provided with access to a personal email account.

In some contexts, the glasses 502 and the terminal 504 may utilize the validating device 506 for additional or alternative types of access rights. For example, the validating device 506 may represent a remote server or system that is in communication with either or both of the glasses 502 and the terminal 504.

In some implementations, when the glasses 502 read a QR code, visual signature, or other identifier from the terminal 504, the glasses 502 may thus verify and validate with the validating device 506 that the validating device 506 was an original source of the identifier. That is, the terminal 504 may utilize an identifier provided by the validating device 506, and the glasses 502 may verify the identifier with both the terminal 504 and the validating device 506. For example, when accessing an email account at a public terminal as in the example above, the user may also verify and validate a received identifier with a remote provider of the email account.

In other examples, the terminal 504 may represent a television or speaker, and the access techniques described herein may be used to provide the television or speaker with personal use preferences (e.g., television shows, songs) of a user of the glasses 502. In this way, the user may enjoy the same or similar levels of personalization across multiple types of devices, even when those devices are not fully equipped to provide such personalization by themselves, and/or when different underlying content platforms are not able to provide a consistent user experience across such platforms. In some examples, as in FIG. 1, access rights for such personalization may be stored at the glasses 502 and/or at the terminal 504.

In these and other examples, the validating device 506 may represent a local device that provides computing resources not available at the terminal 504, and that may be used to provide additional functionality and/or additional types/levels of security.

For example, the validating device 506 may represent a user's personal smartphone. The glasses 502 may be connected to the smartphone using conventional techniques, or using various ones of the techniques described herein, or combinations thereof.

Then, the user may enjoy features of the validating device 506 in conjunction with features of the terminal 504, and with the added convenience of utilizing features of the glasses 502. For example, images recognized by the glasses 502 from display at the terminal 504 may be leveraged/used by the validating device 506.

In other examples, the glasses 502 may initially execute authentication with the validating device, using techniques described herein. Then, the glasses 502 and the terminal 504 may rely on this existing authentication, within a corresponding time window, to facilitate fast, convenient, and secure connections therebetween.

Figure 6:
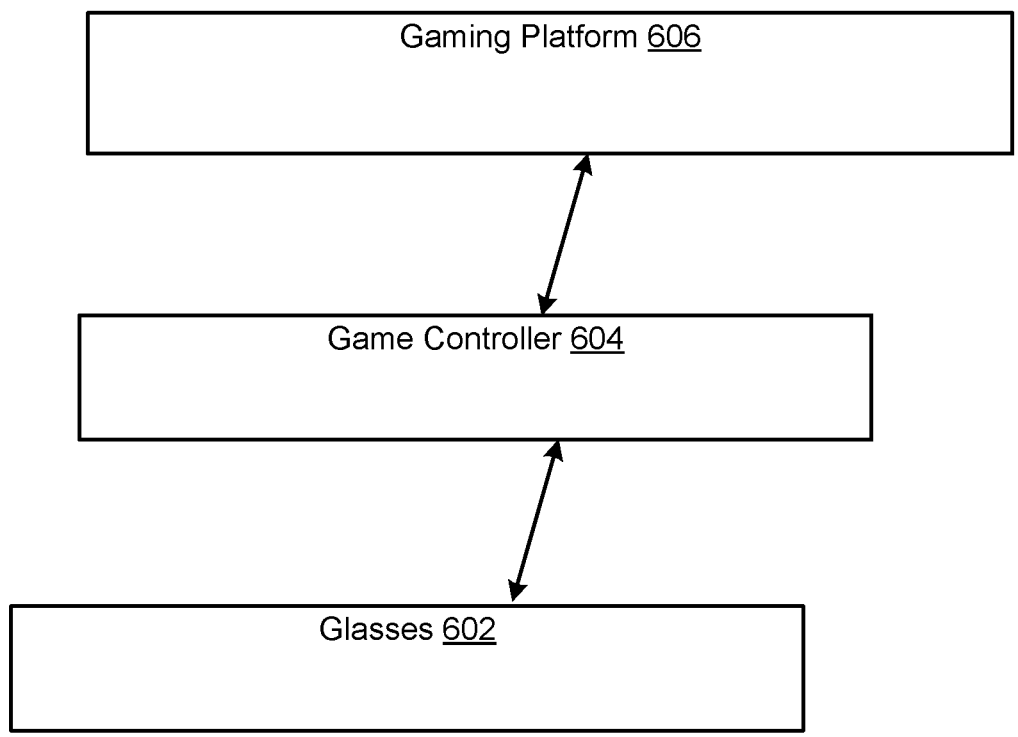
FIG. 6 is a block diagram of an example system for providing personalized access to a gaming platform, using the system of FIG. 1.

FIG. 6 is a block diagram of an example system for providing personalized access to a gaming platform, using the system of FIG. 1. In the example of FIG. 6, glasses 602 may interact with, e.g., authenticate with, a game controller 604. The game controller 604 may thus interact with a corresponding gaming platform 606, including all types of conventional ones of such interactions, but supplemented with, or replaced by, capabilities provided by the glasses 602.

For example, the game controller 604 may represent a wireless, handheld, portable device, that may be configured to interact with multiple types or instances of gaming platforms 606. The gaming platform 606 may be local or remote. When remote, the gaming platform 606 may be accessed through a local device (e.g., personal computer) connected to the game controller 604, or the game controller 604 itself may access the gaming platform 606 remotely.

In various examples, and similar to some of the examples in FIG. 5, the glasses 602 may authenticate against the game controller 604, using the various techniques described herein. Then, the game controller 604 may leverage or rely on that authentication to connect easily with multiple types or instances of the gaming platform 606.

For example, a user of the glasses 602 and game controller 604 may have one or more personal gaming profile(s), and associated data, stored using the game controller 604. When visiting a location of the gaming platform (e.g., someone else's home, or a competition site), the user may easily access such personal gaming profiles, in a secure and convenient manner, and for multiple gaming platforms.

The example implementations of FIGS. 1-6 may be useful for many different types of users. In particular, blind or low-vision users may benefit from the techniques described herein.

For example, such users may struggle or be unable to recognize a presence of a nearby terminal, such as the terminal 504 of FIG. 5. If wearing glasses equipped with the techniques described herein, the user may be alerted to the presence of the terminal and may be authenticated or authorized for access thereto, without requiring any direct interactions between the user and the terminal.

Similarly, users with other physical challenges may easily log into their personal devices, and other devices. For example, users who may struggle to interact with physical I/O methods, such as a keyboard/mouse combination, may utilize the visual two-factor authentication techniques of FIGS. 3 and 4.

FIG. 7 illustrates an example pair of wearable glasses 700 that may be used with the system of FIG. 1. As shown in FIG. 7, wearable glasses 700 includes lens frame 705, lens frame 710, center frame support 715, lens element 720, lens element 725, extending side-arm 730, extending side-arm 735, image capture device 740 (e.g., a camera), on-board computing system 745, speaker 750, and microphone 755.

Each of the frame elements 705, 710, and 715 and the extending side-arms 730, 735 can be formed of a solid structure of plastic and/or metal, or can be formed of a hollow structure of similar material so as to allow wiring and component interconnects to be internally routed through the wearable glasses 700. Other materials can be possible as well. At least one of the lens elements 720, 725 can be formed of any material that can suitably display a projected image or graphic. Each of the lens elements 720, 725 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 715 and the extending side-arms 730, 735 are configured to secure the wearable glasses 700 to a user's face via a user's nose and ears, respectively. The extending side-arms 730, 735 can each be projections that extend away from the lens-frames 705, 710, respectively, and can be positioned behind a user's ears to secure the wearable glasses 700 to the user. The extending side-arms 730, 735 can further secure the wearable glasses 700 to the user by extending around a rear portion of the user's head. Additionally, or alternatively, for example, the wearable glasses 700 can connect to or be affixed within a head-mounted helmet structure. Other configurations for wearable glasses are also possible.

The on-board computing system 745 is shown to be positioned on the extending side-arm 730 of the wearable glasses 700; however, the on-board computing system 745 can be provided on other parts of the wearable glasses 700 or can be remotely positioned from the wearable glasses 700 (e.g., the on-board computing system 745 could be wire- or wirelessly-connected to the wearable glasses 700). The on-board computing system 745 can include a processor and memory, for example. The on-board computing system 745 can be configured to receive and analyze data from the image capture device 740 (and possibly from other sensory devices) and generate images for output by the lens elements 720, 725.

The image capture device 740 can be, for example, a camera that is configured to capture still images and/or to capture video. In the illustrated configuration, image capture device 740 is positioned on the extending side-arm 730 of the wearable glasses 700; however, the image capture device 740 can be provided on other parts of the wearable glasses 700. The image capture device 740 can be configured to capture images at various resolutions or at different frame rates. Many image capture devices with a small form-factor, such as the cameras used in mobile phones or webcams, for example, can be incorporated into an example of the wearable glasses 700.

One image capture device 740 is illustrated. However, more image capture devices can be used, and each can be configured to capture the same view, or to capture different views. For example, the image capture device 740 can be forward facing to capture at least a portion of the real-world view perceived by the user. This forward-facing image captured by the image capture device 740 can then be used to generate an augmented reality where computer generated images appear to interact with or overlay the real-world view perceived by the user.

Wearable glasses 700 can be used to (e.g., the on-board computing system 745) interpret certain gestures (e.g., by a wearer's hand or hands) as user input. For example, wearable glasses 700 can capture hand gestures by analyzing image data from image capture device 740, and initiate tasks that are defined as corresponding to certain gestures. Further, speaker 750 and microphone 755 can be used as input/output components. For example, the microphone 755 can detect speech that can be used to supplement and/or modify the intent associated with the hand gesture. The speaker can be configured to output an audible signal that can be heard by the user. The audible signal can be associated with the task associated with the task(s) that are responsive to the hand gesture. For example, the audible signal can be a beep indicating a task has been completed.

In some implementations, the wearable glasses 700 can determine a user's intent, such as an intent to authenticate as described herein. In some implementations, it should be noted that the wearable glasses 700 may determine user's intent based on a combination of hand gestures and verbal commands from a digital assistant.

Figure 8:
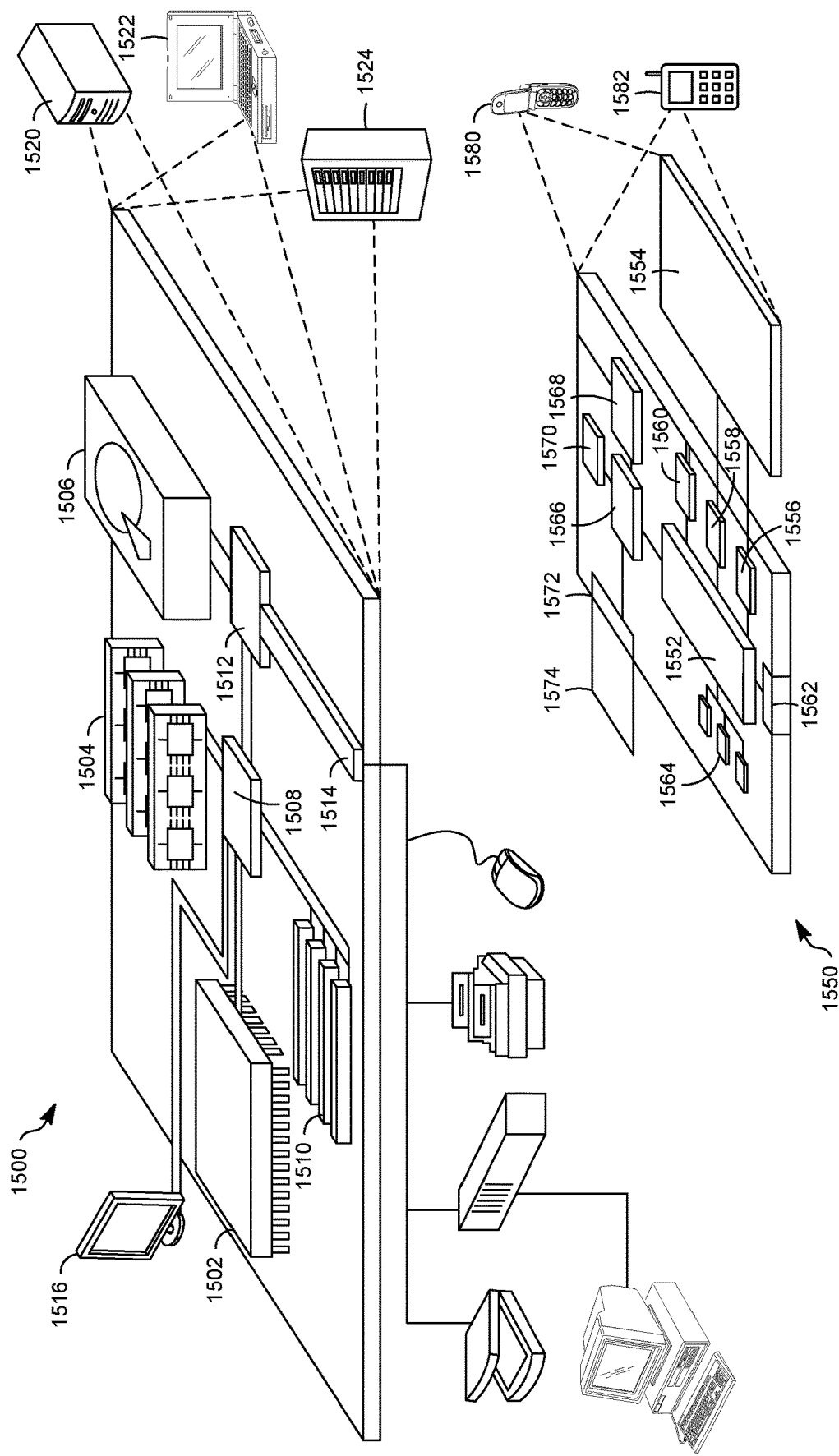
FIG. 8 shows an example of a computer device and a mobile computer device according to at least one example embodiment.

FIG. 8 shows an example of a computer device 1500 and a mobile computer device 1550, which can be used with the techniques described here. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smart phones, and wearable devices such as wearable glasses, head-mounted devices (HMDs), smartwatches, fitness trackers, smart rings, smart clothing, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and can be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses can be used, as appropriate, along with multiple memories and types of memory. Also, multiple computing devices 1500 can be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high-speed controller 1508 manages bandwidth-intensive operations for the computing device 1500, while the low speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1500 can be implemented in a number of different forms, as shown in the figure. For example, it can be implemented as a standard server 1520, or multiple times in a group of such servers. It may also be implemented as part of a rack server system 1524. In addition, it can be implemented in a personal computer such as a laptop computer 1522. Alternatively, components from computing device 1500 can be combined with other components in a mobile device (not shown), such as device 1550. Each of such devices may contain one or more of computing device 1500, 1550, and an entire system can be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components can be mounted on a common motherboard or in other manners as appropriate.

The processor 1552 can execute instructions within the computing device 1550, including instructions stored in the memory 1564. The processor can be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 can be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 can be provide in communication with processor 1552, to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 can be provide as a security module for device 1550, and can be programmed with instructions that permit secure use of device 1550. In addition, secure applications can be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552, that can be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, Wi-Fi, or other such transceiver (not shown). In addition, GPS (Global Positioning System) receiver module 1570 may provide additional navigation- and location-related wireless data to device 1550, which can be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 can be implemented in a number of different forms, as shown in the figure. For example, it can be implemented as a cellular telephone 1580. It may also be implemented as part of a smart phone 1582, personal digital assistant, or other similar mobile device.

Thus, implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
    perform, in response to an access request, a first authentication at the at least one computing device that includes a facial authentication;
    detect a directing of a field of view of a head mounted device (HMD) towards the at least one computing device;
    initiate a second authentication to authorize access to the at least one computing device in conjunction with the access request and in response to the first authentication;
    provide a wake signal for the HMD and a visual identifier identifying the at least one computing device;
    receive verification of the second authentication performed at the HMD using the visual identifier and access rights associated with the HMD;
    determine, from the verification, an indication that the HMD is being worn and that the access rights specify an access time window during which an existing authentication of the HMD is valid, and that the access request is within the access time window; and
    grant the access request, based on the second authentication.

2. The computer program product of claim 1, wherein the instructions, when executed, are further configured to cause the at least one computing device to:
    determine the access rights stored at one or both of the HMD and the at least one computing device.

3. The computer program product of claim 1, wherein the instructions, when executed, are further configured to cause the at least one computing device to:
    verify receipt of the visual identifier at the HMD including receiving the visual identifier from the HMD at the at least one computing device.

4. The computer program product of claim 1, wherein the instructions, when executed, are further configured to cause the at least one computing device to:
    verify the visual identifier with a validating device as having been provided by the validating device to the at least one computing device.

5. The computer program product of claim 1, wherein the instructions, when executed, are further configured to cause the at least one computing device to:
    provide the HMD with access to a linked device that is linked to the at least one computing device, based on the granted access request.

6. The computer program product of claim 1, wherein the visual identifier includes a signature generated by the at least one computing device, and the second authentication includes verification of the signature with respect to a stored signature included with the access rights.

7. A computer-implemented method, the method comprising:
    performing, in response to an access request, a first authentication at a device that includes a facial authentication;
    detecting a directing of a field of view of a head mounted device (HMD) towards the device;
    initiating a second authentication to authorize access to the device in conjunction with the access request and in response to the first authentication;
    providing a wake signal for the HMD and a visual identifier identifying the device;
    receiving verification of the second authentication performed at the HMD using the visual identifier and access rights associated with the HMD;
    determining, from the verification, an indication that the HMD is being worn and that the access rights specify an access time window during which an existing authentication of the HMD is valid, and that the access request is within the access time window; and
    granting the access request, based on the second authentication.

8. The method of claim 7, wherein the visual identifier includes a signature generated by the device, and the second authentication includes verification of the signature with respect to a stored signature included with the access rights.

9. The method of claim 7, further comprising verifying the visual identifier with a validating device as having been provided by the validating device to the device.

10. The method of claim 7, further comprising:
    providing the HMD with access to a linked device that is linked to the device, based on the granted access request.

11. A head-mounted device (HMD) comprising:
    at least one memory including instructions; and
    at least one processor that is operably coupled to the at least one memory and that is arranged and configured to execute the instructions to cause the at least one processor to determine that a first authentication performed at a device and including a facial recognition has been completed in response to determining an access request associated with the HMD for accessing the device, the first authentication including detecting a directing of a field of view of the HMD towards the device;

determine that a request for a second authentication to authorize access to the device has been received in conjunction with the access request and in response to the first authentication and on receiving a wake signal at the HMD from the device;

determine access rights associated with the HMD;

receive, at the HMD and from the device, a visual identifier identifying the device and having been generated by the device in response to the access request and the first authentication, the visual identifier being included with the request for the second authentication;

verify receipt of the visual identifier at the HMD;

provide, to the device, verification of the second authentication performed at the HMD using the visual identifier and access rights associated with the HMD;

provide, with the verification, that the access rights specify an access time window during which an existing authentication of the HMD is valid, and that the access request is within the access time window; and provide, to the device, an indication that the HMD is currently being worn;

execute the second authentication using the visual identifier and the access rights to enable granting of the access request; and instruct the device to grant the access request, based on the verified receipt and the second authentication.

12. The HMD of claim 11, wherein the visual identifier includes a signature generated by the device, and the second authentication includes verification of the signature with respect to a stored signature included with the access rights.

13. The HMD of claim 11, wherein the instructions, when executed, cause the at least one processor to:

verify the visual identifier with a validating device as having been provided by the validating device to the device.

14. The HMD of claim 11, wherein the instructions, when executed, cause the at least one processor to:

provide the HMD with access to a linked device that is linked to the device, based on the granted access request.

* * * * *